Aug. 1, 1961 H. H. KOLM 2,994,808
HIGH FLUX DENSITY APPARATUS
Filed Feb. 20, 1959 2 Sheets-Sheet 1

INVENTOR.
HENRY H. KOLM
BY
Blair Spencer & Buckles
ATTORNEYS

Aug. 1, 1961 H. H. KOLM 2,994,808

HIGH FLUX DENSITY APPARATUS

Filed Feb. 20, 1959 2 Sheets-Sheet 2

INVENTOR.
HENRY H. KOLM
BY
Blair Spencer & Buckles
ATTORNEYS

United States Patent Office 2,994,808

Patented Aug. 1, 1961

2,994,808

HIGH FLUX DENSITY APPARATUS

Henry H. Kolm, Weir Meadow Road, Wayland, Mass.

Filed Feb. 20, 1959, Ser. No. 794,756
14 Claims. (Cl. 317—158)

Figures 1, 5:
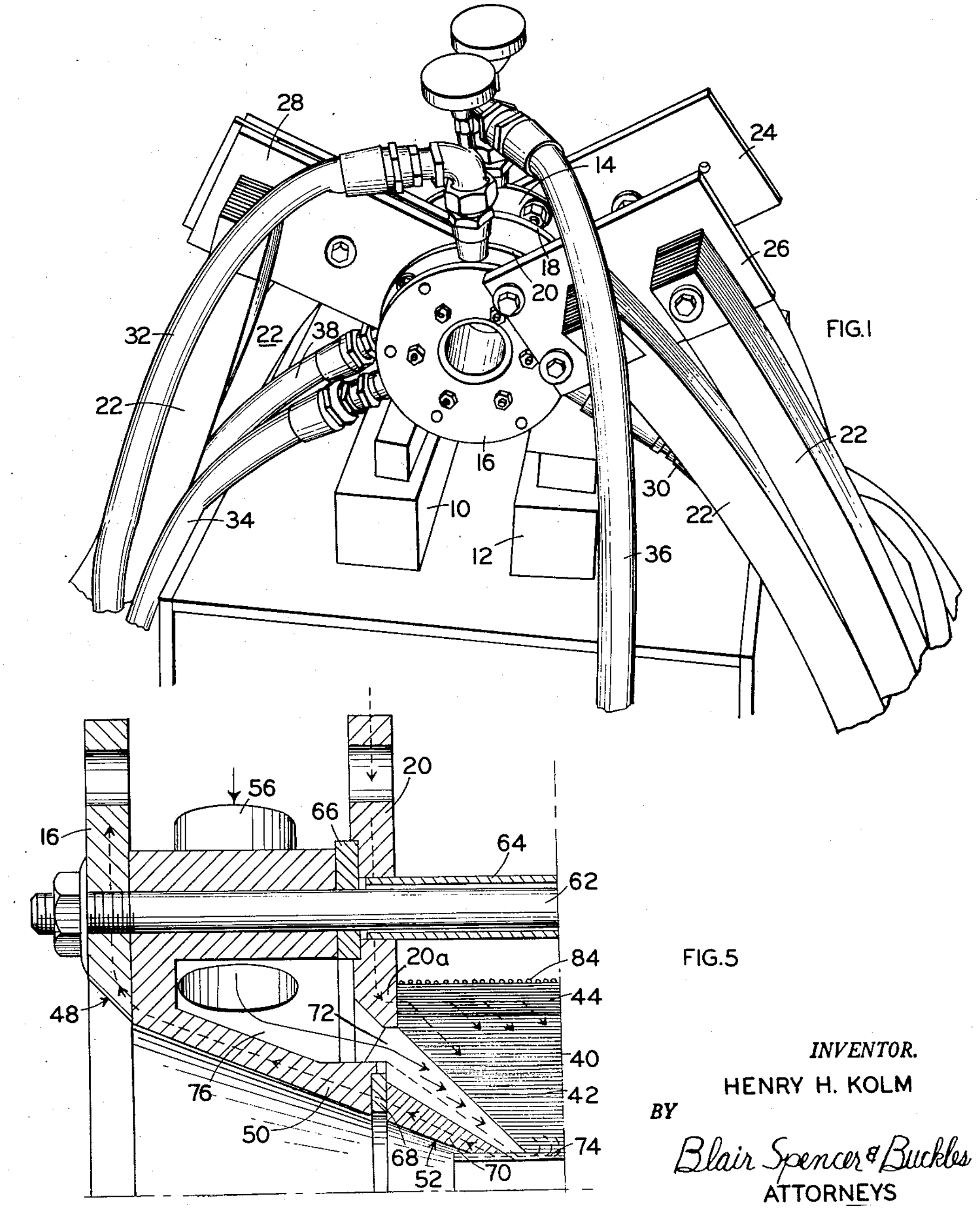

This invention relates to an improved high flux density solenoid adapted to generate a flux density of over one hundred kilogauss for extended periods of time and capable of greater efficiency than prior solenoids operable in this region. The solenoid has a reinforced spiral configuration with the spaces between turns providing flow paths for suitable liquid coolants.

Solenoids capable of high flux density have wide application in the study of various physical phenomena. For example, the electronic band structures on which the electrical and optical properties of solid state material depend may be efficiently investigated by illuminating these materials with radiation of various wave lengths in the presence of a high intensity field. The determination of the momentum of a charged particle may be made by observing the deflection of the particle by a magnetic field. Where the particle has a high momentum, e.g., cosmic rays, a strong field is required to obtain an observable deflection. Other properties of atomic and subatomic particles which are desirably investigated in the presence of strong magnetic fields include magnetic resonance phenomena basic to the operation of solid state masers and microwave ferrite devices. The effect of strong magnetic fields on the behavior of gaseous plasmas is of importance in investigations relating to controlled thermonuclear fusion.

The magnetic field, H, at the center of a solenoid is related to the product of the electric current and the number of turns and roughly inversely proportional to the volume of the solenoid. The field and the flux density, to which the field is linearly related in a nonmagnetic medium such as air, may therefore be increased by increasing in the same volume either the current carried by the solenoid or the number of turns carrying the current. However, there is a practical limit on field intensity imposed by the fact that the efficiency of an electromagnet is zero, that is, it dissipates in the form of heat all of the electrical energy supplied to it. As the current or number of turns of a solenoid is increased, the dissipation increases to the point where the rate of removal of heat from the relatively small volume occupied by the solenoid can no longer be increased. Further dissipation will burn out the unit.

More specifically, the field at the center of a solenoid may be expressed in terms of the relevant design characteristics of the magnet by $$H=G\left(\frac{W\lambda}{\rho a}\right)^{1/2}$$

where,

G is a geometry factor determined by the shape and current distribution of the solenoid,
W is the power supplied to and removed from the solenoid under steady state conditions,
$\lambda$ is the space factor or fractional volume occupied by the conductor,
$\rho$ is the resistivity of the conductor at the operating temperature, and
$a$ is the inner radius of the solenoid.

Several solenoid design problems are immediately apparent from Equation 1. As the power dissipated in the solenoid is increased, a greater contact area between the conductor and the coolant is required to remove the heat, and this requires a decrease in the space factor, thereby offsetting the effect of increased power. Moreover, appreciable internal forces are developed in high flux density solenoids and a decrease in the amount of conductor material may weaken the structure to the point of breakage. If the temperature of the solenoid is allowed to rise appreciably with increased power dissipation, there will be a concomitant increase in the resistivity with a further adverse effect on field intensity. It follows that efficient solenoid design requires that the ratio of conductor surface to volume be maximized as well as the amount of heat removed per unit surface. The inner radius, i.e., the radius of the core area, may also be decreased, but there is a practical lower limit on the radius imposed by the space required for objects on which the magnetic field is to act together with instrumentation required in various experiments.

Prior to my invention, the most successful high flux density solenoid was a helix formed from a series of copper discs. Each of the discs has a central bore and a radial cut extending from the bore to the outer edge. The two radial edges thus formed are offset much in the manner of conventional lock washers, and a radial edge of one disc is connected to a corresponding edge of the next one. The discs are provided with a plurality of small holes through which a coolant can be forced longitudinally through the solenoid. The space factor of a solenoid having this configuration is relatively high but the heat transfer area is low. Therefore, the size cannot be reduced sufficiently to provide a large number of ampere turns in a small volume. Moreover, the flux density of this solenoid construction does not increase linearly with current. As the current increases, the conductor temperature rises substantially, particularly in the central portions, and the current is gradually forced outward where it contributes less to the flux density in the central or core region. The maximum flux density obtainable, within practical limits, with this configuration is on the order of 100,000 gauss, whereas it is desirable in many applications to have a flux density considerably greater than that figure.

Another solenoid construction that has been used has a spiral wound configuration in which the successive turns are disposed radially outward from each other rather than longitudinally as in a helix. This construction has, prior to my invention, been unsuccessful in high field applications, because of inability to provide the required cooling and also because of a lack of the strength required to contain the enormous radial forces generated by currents of 10,000 and more amperes passed through the solenoid.

Accordingly, it is a principal object of the present invention to provide an improved solenoid construction capable of high flux densities at greater efficiency than solenoids heretofore obtainable. More particularly, it is an object of my invention to provide a solenoid construction of the above character having a greater heat transfer area and filling factor, together with requisite mechanical strength and capable, therefore, of higher flux density on a continuous basis than prior constructions, for a given volume and power input. A further object of the invention is to provide a solenoid of the above character adapted for practical generation of flux densities on the order of 250,000 gauss over extended periods of time. It is another object of the invention to provide a flux density of this order of magnitude over a sufficient area to permit application of the high density flux to articles of substantial size. It is a further object of the invention to provide a solenoid of the above character whose construction permits both longitudinal and radial access to areas of high flux density in order to facilitate observation of objects disposed in these areas. It is yet another object of the invention to provide a solenoid of the above character which has a compact construction for efficient utilization of electrical power and yet may readily be cooled by conventional cooling techniques. Other objects of the invention will in part be obvious and will in part appear hereinafter.

The invention accordingly comprises the features of construction, combination of elements and arrangement of parts which will be exemplified in the construction hereinafter set forth and the scope of the invention will be indicated in the claims.

Figure 2:
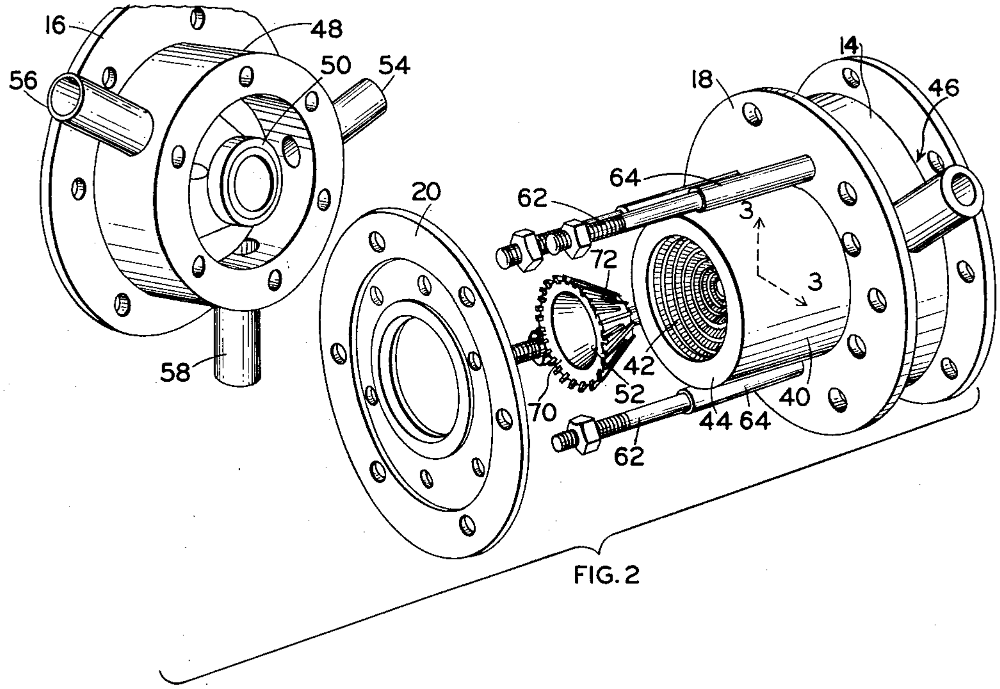
Figure 3:
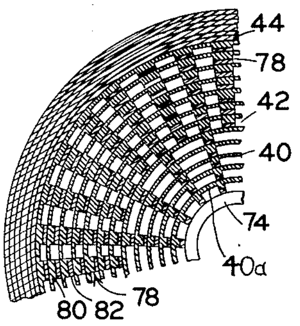
Figure 4:
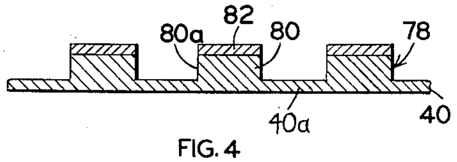

For a fuller understanding of the nature and objects of the invention, reference should be had to the following detailed description taken in connection with the accompanying drawings, in which:

FIGURE 1 is a perspective view of a solenoid made according to my invention together with associated power and cooling connections, FIGURE 2 is a perspective view, partly exploded to show the relationship of certain parts of the solenoid of FIGURE 1, FIGURE 3 is a fragmentary radial section taken on line 3—3 of FIGURE 2 and showing in detail the makeup of the winding of the solenoid, FIGURE 4 is an enlarged fragmentary section of the conductor and associated spacers used in forming the solenoid, and FIGURE 5 is a fragmentary longitudinal section showing the mode of connection of the exploded parts of FIGURE 2.

The present invention utilizes a spiral wound construction with the adjacent turns separated by radially aligned spacers. The spacers take up the forces generated by the solenoid current and transmit them to the outer periphery of the solenoid where they are contained by a member specifically designed for that purpose. The spacers are comprised in large part of thickened portions of the conductor itself with thin insulating members disposed between these thickened portions and the adjacent turns to prevent electrical contact. The coolant is passed longitudinally through the solenoid between the various turns thereof.

The thickened portions of the conductor serving as parts of the spacers enhance the operation of the solenoid in two ways. In the first place, although there is less available heat transfer from these areas of the conductor to the coolant, the thickened portions decrease the resistance of the conductor in these areas, thereby reducing the amount of heat generated in them. Furthermore, these portions, by extending into the coolant stream, manage to transfer heat to the coolant through their longitudinal sides. The advantages of this construction over the use of spacers comprised entirely of insulating material will be readily apparent. Furthermore, by transmitting all the internal forces to an exterior member which is not required to contribute to the magnetic field, the conductor itself is relieved of that function, and therefore the ratio of heat transfer surface area to conductor volume is further improved.

As an example of the improvement in efficiency afforded by my invention, a solenoid constructed in accordance therewith can generate a field of 120,000 gauss in a central core region having a one inch diameter, with a power input of 1.7 megawatts. The best prior solenoid, the helical unit described above, generates 100,000 gauss under the same conditions. At higher flux densities, the improvement is much greater, since the flux developed by my solenoid increases linearly with current, while that of the prior construction increases at a much lower rate because of the change in radial current distribution with increased current. The linear flux-current relationship is of advantage also in facilitating determination of flux density by measuring the solenoid current.

As best seen in FIGURE 1, a solenoid made according to my invention may be mounted on suitable blocks 10 and 12. The solenoid has a pair of end flanges 14 and 16 and interior flanges 18 and 20 serving as electrical terminals. Current is conducted to the solenoid by suitable cables 22 connected to the respective flanges by bus bars 24 and 26 connected to the end flanges 14 and 16 and a bus bar 28 connected to the interior flanges 18 and 20. The flanges 18 and 20 are thus connected together as are the end flanges, and in a manner to be described, the end flanges are connected to the inner end of the spiral wound solenoid conductor and the interior flanges to the outer end thereof. In the illustrated embodiment, three input pipes 30, 32 and 34 deliver a coolant, preferably water, to one end of the solenoid, and the coolant passes longitudinally between the various turns of the winding to exit through pipes 36, 38 and another one not shown.

More particularly, as seen in FIGURE 2, the solenoid has a central section comprising a single spiral wound conductor 40. The conductor 40 has an inner section 42 whose turns are radially spaced, and current through this section generates a magnetic field along the axis of the solenoid. In the outer section 44 of the conductor 40, the adjacent turns are not spaced. The outer section is thus a member of considerable strength and may serve to take up the interior forces transmitted thereto from the inner section by spacers to be described. The outer section 44 also serves as a low resistance conductor adapted to provide longitudinal distribution of the current passed into it from the interior flanges 18 and 20 connected thereto.

A pair of manifolds generally indicated at 46 and 48 conduct the coolant from the exterior pipes through the interior of the solenoid. Since the components at one end of the solenoid may take the same form as those at the other end, the following discussion of these components will deal specifically only with the exploded parts on the left (FIGURE 2). The manifold 48 is insulated from the interior flange 20 but in electrical contact with the end flange 16; it is provided with a hub 50 extending through the flange 20 to connect with an insert generally indicated at 52 which in turn is electrically connected in a manner to be described to the inner end of the conductor 40. The insert and cooperating end of the inner section 42 are shown as being conically shaped. This shape is utilized to provide a particular field distribution at the end of the unit, and other shapes, including flat, may be substituted therefor. The coolant passes through connectors 54, 56 and 58 to the interior of manifold 48 and thence through flange 20 around insert 52 to the interior of the winding 40. The flow pattern takes place in the reverse direction as the fluid exits from the conductor 40 and passes through manifold 46 as it exits from the solenoid. A plurality of bolts 62 passing through the respective flanges are tightened up on the end flanges 14 and 16 to draw the assembly together. Suitable jackets 64 around the bolts serve to insulate the interior flanges 18 and 20 therefrom.

Turning now to FIGURE 5, the inner portion 20*a* of flange 20 is seen to be in contact with the outer section 44 of conductor 40. Preferably, this connection is made by soldering, to minimize electrical resistance. The flange 20 is insulated from the manifold 48 by a suitable gasket 66 preferably of silicone rubber or like material capable of withstanding the heat encountered in fabrication and operation. The hub 50 is connected to the insert 52 by a gasket 68, preferably of soft copper to provide minimum electrical resistance while making a suitable watertight connection. The insert 52 comprises a central portion 70 provided with slots in which are inserted ribs 72 (FIGURES 2 and 5) of suitable insulating material. The ribs 72 are aligned with and bear against radially aligned spacers 78, to be described, disposed between the turns of the inner section 42 of the solenoid; in this fashion they prevent axial or telescoping motion of the spiral conductor 40. The ribs are in turn constrained in the axial direction by the central portion 70 and in the radial direction by the inner edge 20a of the flange 20.

The central portion 70 of insert 52 is soldered to a central pipe or barrel 74 to which the conductor 40 is similarly connected. The pipe 74 is of sufficient thickness to minimize resistance and thereby serve to distribute the electric current axially along the conductor 40. The flow of electric current through the solenoid thus follows the direction indicated by the dash-line arrows of FIGURE 5.

The flow of coolant follows the path of the solid-line arrows of FIGURE 5 through connector 56 into an interior chamber 76 in the manifold 48, through the annular space between inner portion 20a of the flange 20 and the hub 50 and insert 52, and thence between the ribs 72 to the inner section 42 of conductor 40. The coolant then flows between the individual turns of the section 42 and passes out the other end of the solenoid and through manifold 46 in similar fashion to its entry.

In FIGURES 3 and 4, I have illustrated in detail the novel configuration of the spiral wound conductor 40. As shown therein, the individual turns of the inner section 42 of the winding are separated by spacers generally indicated at 78. The spacers consist mostly of conducting portions 80 either formed integrally with the conductor 40 or joined thereto by suitable techniques such as brazing or soldering to insure joints having negligible resistance to electric current and heat flow. The conducting portions 80 are covered with thin layers 82 of suitable insulating material such as mica or the like which provide electrical insulation between adjacent turns of the inner section. The potential across the entire solenoid for a current of 10,000 amperes is on the order of 200 volts, and therefore the voltage between adjacent turns is quite low. Accordingly, the insulating layers 82 may be quite thin, on the order of .001 inch, with a total spacer thickness of .01 inch, for such a solenoid.

Thus, the conducting portions 80 occupy almost the entire thickness of the spacers 78, thereby minimizing the electrical resistance and energy dissipation in the portions of the conductor 40 at the spacers. This is a very desirable feature, since, as best seen in FIGURE 3, the portions 40a of the conductor 40 between the spacers present proportionately much larger surfaces to the flowing coolant and therefore are much better able to transfer to the coolant, in the form of heat, the energy dissipated therein. Furthermore, the conducting portions 80 present radially extending side surfaces 80a to the coolant, and the greater the area of these surfaces, the greater the transfer of heat to the coolant.

The spacers 78, each of which preferably extends the entire length of the solenoid, are radially aligned in the manner shown in FIGURE 3, and therefore they are capable of transmitting to the outer section 44 the radial forces generated in inner section 42. The number of spacers required depends on the span of the unsupported intermediate sections 40a of the conductor 40 able to withstand such forces. For a conductor thickness of .01 inch in the unsupported portions, the span is on the order of .125 inch for a current of 10,000 amperes. The spacers may have approximately the same width.

Except for members which are required to be electrical insulators, it is generally desirable that the solenoid and associated parts have the highest possible electrical and heat conductivity consonant with strength and reasonable cost of construction. Accordingly, silver-bearing copper is the preferred material. However, copper tends to creep to some extent upon the application of large stresses for extended periods of time, and therefore, over a period of time, the outer section 44 of the conductor 40 might undergo permanent expansion. To offset this tendency, I prefer to form a winding 84 (FIGURE 5) of piano wire or the like around the outer section. The wire is preferably wound under stress so as to render negligible the expansion of the outer section under the internal magnetic forces, and thereby prevent creep.

In order to appreciate the heat dissipation capability of a solenoid of the above construction, one should consider the dimensions of a 10,000 ampere, 200 volt unit, dissipating a total of 2 megawatts and capable of producing a flux density of approximately 140,000 gauss. The inner section 42 of the conductor 40, where almost the entire electrical power is consumed, has an inner diameter of ⅝ inch and an outer diameter of 2¾ inches for a thickness of 2⅛ inches. The length at the outer diameter is 2¾ inches and at the inner diameter ⅝ inch. With the construction described above, the entire 2,000,000 watts may be transferred to a coolant of deionized water flowing through the unit at a rate of 250 gallons per minute. With the same unit and using the heat transfer characteristics of nucleate boiling, i.e., with the water slightly below the boiling point and the copper conductor slightly above, several times the above power may be dissipated with a corresponding increase in the flux density.

The heat transfer characteristics of my solenoid may be improved even further by forming the layers 82 of the spacers 78 with suitable semiconducting rather than insulating material, thereby to utilize the effects of thermoelectric cooling. It is well known that objects of certain materials exhibiting semiconducting properties operate as heat pumps when electric currents are passed through them. The current causes a drop in temperature at one end with a concomitant rise at the other end. Thus, if the layers 82 are formed from these materials and the voltage applied to the solenoid has the right polarity, each of these layers will extract heat from the inner turn to which it is connected and deliver heat to the next adjacent outer turn. The succession of such layers in each radial stack of spacers 78 will thus pump heat from the inner portions of the solenoid to the outer portions where it may be more easily transferred to a coolant. Such construction permits even greater total dissipation within the solenoid or closer spacing of the inner turns, whichever is more desirable, to increase the flux density capability of the unit. If water is used as a coolant, nickel oxide, manganese oxide and bismuth telluride are among the semiconductor materials which may be utilized for thermoelectric cooling at the operating temperatures in the interior of the solenoid.

The use of thermoelectric cooling also permits operation of a solenoid of my design at extremely low temperatures such as that of liquid helium, 4.2° K. Resistivity of copper at this temperature is on the order of .01 percent of the resistivity when water is used as a coolant, and therefore, from Equation 1, one might expect a much greater flux density by use of liquid helium as a coolant, even in the absence of thermoelectric cooling. However, the heat transfer rate from the conductor to a liquid generally decreases with decreasing temperature at a higher rate than the resistivity, so that the permissible power dissipation is extremely low. Thus, in a given solenoid, liquid helium coolant provides lower flux density than water under normal conditions and considerably less than that when nucleate boiling of the water is utilized.

On the other hand, the transfer of heat between a metal and a semiconductor is substantially unaffected by low temperature operation. Also, the thermoelectric transfer of heat through a given material is proportional to the absolute temperature, and therefore this mechanism of heat transfer, unlike that of a liquid, does not decrease as rapidly with decreasing temperature as the resistivity of the conductor. A net gain in field intensity in a given solenoid can therefore be achieved by low temperature operation if layers 82 of semiconductor material are used to transfer the heat to external portions of the solenoid where comparatively large transfer surfaces in the form of fins or the like (not shown) may be used to pass the heat into the liquid coolant. In this manner, one may operate the inner section 42 at extremely low temperatures. The combination of the resulting low resistivity with comparatively high power dissipation increases manifold the flux density capability of the unit. Where such operation is utilized, it may be desirable in the inner turns of the section 42 to eliminate the conducting portions 80 and make the conductor 42 therein as thick as the combined thickness of the conducting portions and the intermediate portions 40*a*. A continuous semiconductor layer may then extend between each turn and the next along these inner turns. This latter construction serves two purposes. It materially reduces the resistance of the inner turns and thus reduces proportionately the heat dissipated in them. Further, the method of heat transfer in this portion of the winding is entirely converted from the relatively inefficient copper-to-liquid helium flow to the relatively efficient thermoelectric heat pumping effect. The current through the solenoid may thus be increased with an increase in available flux density. The flux density may also be increased by eliminating altogether the conducting portions 80 to reduce the spacing between the inner turns, with the aforementioned continuous thermoelectric layers serving to pump the heat outwardly from this portion. Thus, although the maximum permissible current remains the same, the number of turns close to the axis of the solenoid is increased.

Thus, I have described a novel solenoid capable of higher flux densities than any solenoid heretofore available. The advantages of my invention accrue from the use of a spiral wound configuration incorporating radially aligned spacers which transmit the magnetically produced high internal forces to exterior portions capable of withstanding such forces. The spacers described also provide a much greater heat transfer area within the solenoid, thereby permitting increased electrical dissipation within the unit and resulting higher flux density. In another embodiment of the invention, semiconductors are inserted between the adjacent turns of the solenoid to pump heat outwardly from the inner turns to the exterior of the winding where it may be more readily transferred to a cooling medium. The heat dissipation in the central portion of the solenoid may thus be further increased to provide still greater flux density. Of particular importance, a solenoid designed according to the present invention provides access at a half-angle of 21.8° to the center of its volume, which makes it especially suitable for infrared or other optical experiments requiring large apertures.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. An improved solenoid comprising, in combination, a spiral wound sheet conductor, radially aligned spacers between adjacent turns of said conductor, said spacers comprising metallic portions of high heat conductivity spanning most of the distance between adjacent turns and in high thermal and electrical conductivity relationships with one of the turns adjacent thereto and portions of relatively low electrical conductivity spanning the remaining distance, the areas between said spacers serving as passages through which a coolant may be passed axially of said solenoid to cool said conductor, the portions of said conductor not contacted by said spacers being in direct contact wtih said coolant.

2. The combination defined in claim 1 in which said low conductivity portions are insulators.

3. The combination defined in claim 1 in which said low electrical conductivity portions are semiconductors adapted for thermoelectric conduction of heat radially outwardly in said solenoid.

4. An improved solenoid comprising, in combination, a spiral wound sheet conductor, radially aligned spacers between adjacent turns of said conductor, said spacers between the inner turns of said conductor including layers of semiconductor thermoelectric material in close thermal and electrical conducting relationship with adjacent turns, said spacers between turns exterior of said inner turns being circumferentially spaced to form ducts through which a coolant may be passed axially of said solenoid to cool said conductor, said spacers between said exterior turns comprising metallic portions of high heat and electrical conductivity in intimate thermal and electrical conducting relationship with one of the turns of said conductor between which they are disposed, said high conductivity portions spanning substantially all of the distance between said adjacent turns, the portions of the surfaces of said conductor not in close conducting relationship with said spacers being directly exposed to coolant passed through the ducts formed by said spacers.

5. The combination defined in claim 4 including a circumferential constraining member adapted to absorb the forces transmitted radially outwardly by said spacers.

6. Improved magnetic flux producing apparatus comprising, in combination, a solenoid in the form of a spiral wound conductor, radially aligned spacers between the adjacent turns of said conductor, said spacers presenting relatively high resistivity paths to the flow of current therethrough, the areas between said spacers serving as ducts through which coolant may be passed axially of said solenoid, an axial electrically conductive tube in the center of said solenoid and connected to the innermost turn thereof, substantially throughout the entire axial length thereof, axial constraining members disposed against the ends of said solenoid, said constraining members including annular cores in electrical conducting relationship with said tube and radially extending insulating inserts in said cores aligned with said spacers and spacing said cores from the turns of said solenoid, annular flanges electrically connected to the ends of said solenoid adjacent the outer turns thereof, the inner edges of said flanges being substantially coextensive with said outer turns, coolant manifolds having annular central portions spaced from said flanges and in electrical conducting relationship with said core of said axially constraining member, means axially urging said manifolds together to compress said flanges, said constraining members and said solenoid between said manifolds providing axial constraint on the turns of said solenoid, insulators between said manifolds and said flanges, whereby coolant may pass through one of said manifolds over its central portion, through the adjacent flange, over the core of the adjacent constraining member and thence through said ducts to cool said conductor, and electric current may pass through a circuit comprising one of said flanges, said conductor, one of said cores, and said inner portion of the manifold adjacent said one core.

7. An improved magnet comprising, a combination, a spiral wound sheet conductor, radially aligned spacers between successive adjacent first turns of said conductor, said spacers being metallic, each of said spacers being in intimate contact with one of the turns between which it is disposed and separated from the other of said adjacent turns by an object of relatively high electrical resistivity, whereby the areas between said spacers serve as ducts through which a coolant may be passed axially of said solenoid to cool said conductor, and whereby said spacers maintain a substantial effective surface area of said conductor exposed to said coolant and substantially decrease the resistance of said conductor at the locations in which they are in contact therewith.

8. The combination defined in claim 7 including a plurality of outer turns of said conductor in full contact with each other, said outer turns thereby being adapted to contain the radial forces developed by the passage of currents through said first turns of said conductor.

9. The combination defined in claim 7 including a constraining member disposed about the outer periphery of said conductor and adapted to contain the radial forces exerted by current passing through said first turns of said conductor.

10. The combination defined in claim 9 including a metallic tube disposed coaxially within said magnet and in intimate electrical contact with the innermost turn of said said conductor.

11. The combination defined in claim 7 in which said objects of high electrical resistivity are of semi-conductor material.

12. A solenoid comprising, in combination, a spiral wound conductor, a layer of semi-conductor thermoelectric material between and in close thermal and electrical conducting relationship with each of the adjacent inner turns of said conductor, radially aligned spacers between all the turns exterior of said inner turns and a circumferential constraining member adapted to absorb the forces transmitted radially outwardly through said spacers, each of said spacers having a metallic portion of high heat and electrical conductivity in thermal and electrical conducting relationship with one of the turns of said conductor between which said spacer is disposed and spanning a substantial portion of the distance between the turns between which the spacer is disposed, each of said spacers also including a portion of relatively low electrical conductivity spanning the remaining portion of said distance.

13. The combination defined in claim 12 in which said portion of relatively low conductivity is an electrical insulator.

14. The combination defined in claim 12 in which said portion of low electrical conductivity is a semiconductor having thermoelectric properties.

References Cited in the file of this patent

UNITED STATES PATENTS

| | | |
|---|---|---|
| 2,424,973 | Edmonds | Aug. 5, 1947 |
| 2,809,230 | Moses | Oct. 8, 1957 |
| 2,863,130 | Gray | Dec. 2, 1958 |

UNITED STATES PATENT OFFICE

CERTIFICATE OF CORRECTION

Patent No. 2,994,808 August 1, 1961

Henry H. Kolm

It is hereby certified that error appears in the above numbered patent requiring correction and that the said Letters Patent should read as corrected below.

Column 3, lines 56 and 57, for "thereforce" read -- therefore --; column 8, line 60, for "a", first occurrence, read -- in --.

Signed and sealed this 26th day of December 1961.

(SEAL)
Attest:

ERNEST W. SWIDER
Attesting Officer

DAVID L. LADD
Commissioner of Patents

USCOMM-DC